April 8, 1958  J. C. BAILEY  2,829,876
CUSP BREAKER MEANS FOR BORING TYPE MINING MACHINE
Filed June 20, 1957  2 Sheets-Sheet 1

INVENTOR.
Jack C. Bailey
BY
Murray A. Gleeson
ATTORNEY

April 8, 1958

J. C. BAILEY 2,829,876

CUSP BREAKER MEANS FOR BORING TYPE MINING MACHINE

Filed June 20, 1957

INVENTOR.
Jack C. Bailey
BY
Murray A. Gleeson
ATTORNEY

United States Patent Office 2,829,876
Patented Apr. 8, 1958

2,829,876

CUSP BREAKER MEANS FOR BORING TYPE MINING MACHINE

Jack C. Bailey, Madisonville, Ky., assignor to Goodman Manufacturing Company, Chicago, Ill., a corporation of Illinois Application June 20, 1957, Serial No. 666,993

4 Claims. (Cl. 262—7)

This invention relates to boring type continuous mining machines and particularly to an improved cusp breaker therefor.

In boring type mining machines, for example as shown in Gonski co-pending application Serial No. 577,688 filed April 12, 1956 now issued as Patent No. 2,802,654 dated August 13, 1957, a pair of boring arm assemblies are rotatable about spaced, horizontal axes and cut intersecting parallel bores in a deposit of mineral. A pair of generally triangular cusps are left by the boring assemblies, depending from the roof and upstanding from the floor. These cusps are cut free at their bases, as by orbitally movable cutter chains supported in cutter bars or guides. The upper cutter bar has a downwardly flared lower surface which exerts a downward camming action on the upper cusp to pry it loose from the face whence it falls and breaks into pieces small enough to pass through the machine's carry-away conveyor. Likewise, the lower cutter bar has an upwardly flared upper surface which exerts an upward camming action on the lower cusp to pry it loose from the face. It, however, is already on the floor so it cannot fall to break it into pieces small enough to pass onto the conveyor. Unless broken up, this lower cusp is often large enough to jam the throat and stop the operation of the machine until someone climbs in and breaks it with a pick or sledge.

Accordingly, it is a primary object of the present invention to provide simple, safe, rugged and effective means for automatically breaking the lower cusp into pieces small enough to avoid jamming of the conveyor.

I have found that this can be accomplished by providing a pair of upstanding breaker plates or blades, in or just ahead of the conveyor throat, each plate being spaced off to one side of center so it will engage the cusp at a point where it is thinner and therefore weaker than at the center. In one specific example, where the invention has been applied successfully to a twin bore miner cutting a bore about 7 feet high and 13 feet wide, and having a conveyor 24 inches wide, I have had excellent results in welding the breaker plates onto the cutter bar, just ahead of the conveyor throat, each being 8 inches laterally of center, that is 16 inches apart. By contrast, I have found that such breaker plate means are generally ineffective where located to engage the cusp in the center, for that is where it is strongest and least likely to break.

Other objects and advantages will be apparent from the following description taken in connection with the drawings in which.

Like parts are referred to by like reference characters throughout the figures of the drawings.

Figure 1:
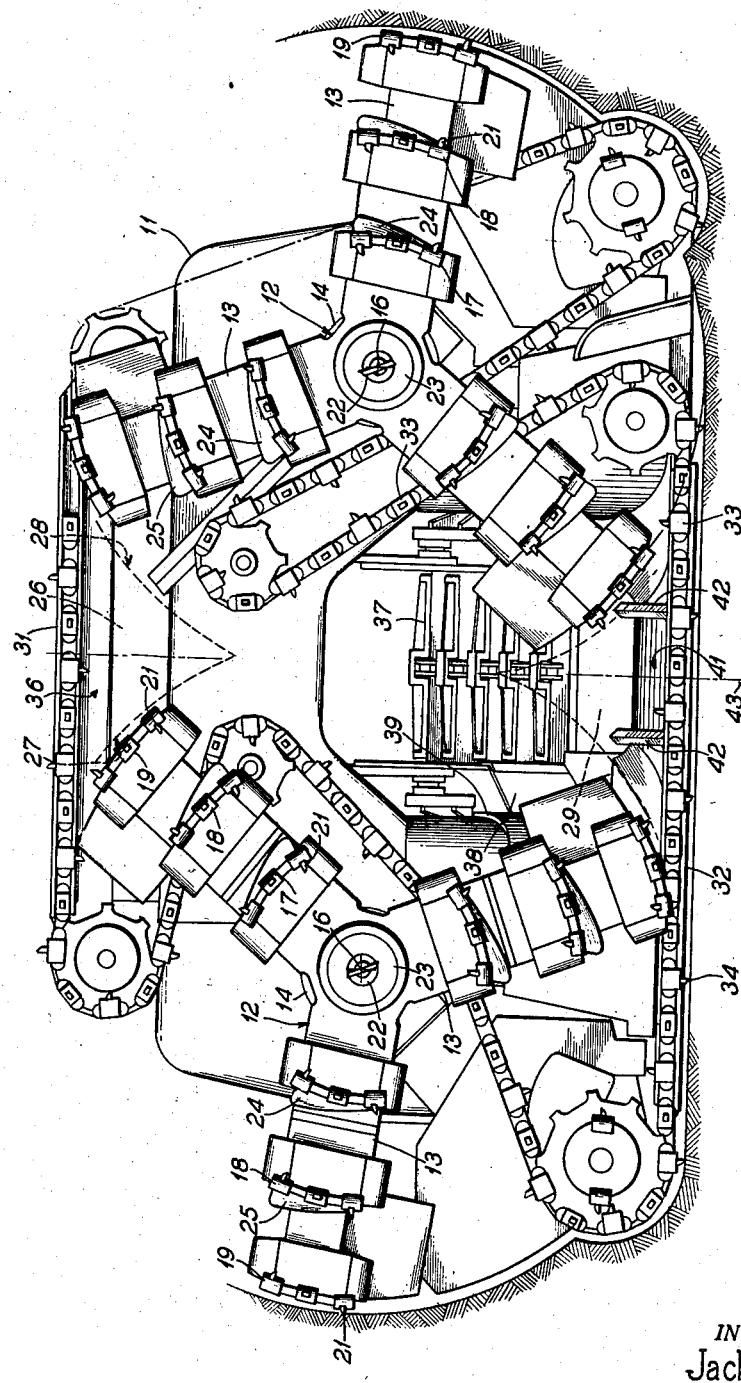
Figure 1 is a front view of a twin bore continuous mining machine employing a preferred form of the present invention.

Referring now more particularly to the drawings, the continuous mining machine shown is of the boring type having a frame 11 with a pair of boring heads 12, 12 at the forward end, each head comprising a plurality of radial boring arms 13 mounted on a shaft 14, the two shafts being rotatable about spaced parallel, horizontal axes 16, 16 extending longitudinally of the frame. Each arm 13 includes three forwardly extending brackets 17, 18 and 19 carrying cutter bits 21 effective to cut a series of three concentric kerfs in the mining face of a mineral deposit, such as coal. A center bit 22 extending from each shaft 14, cuts a pilot hole and a conical breaker 23 behind the center bit breaks the first core into the circular kerf cut by bracket 17. Likewise, wedges 24, 25 on brackets 17 and 18 respectively break the second and third cores outwardly into the clearance provided by the kerfs.

In the present case, the axes 16, 16 are sufficiently close together that the boring heads 12, 12 cut intersecting circles. This leaves an upper cusp 26 depending from the roof between the bores 27, 28. Likewise, there is left an upstanding cusp 29. Both cusps are generally triangular in shape, affixed at their bases to the roof and floor respectively. Once in a while these cusps will break off due to the vibration and advance of the machine but this is usually not the case and they must be cut off. The particular cutting means here comprises upper and lower cutter bars or guides 31 and 32 along which is trained an orbitally movable chain 33 fitted with cutter bits 34. The cutter chain is effective to cut the cusps free at the roof and floor levels, along the bases of the cusps, leaving them attached to the mineral deposit only at the face. This face attachment is broken loose by camming or prying them off. In the case of the upper cusp, the upper cutter bar is provided with a depending wedge or camming surface 36 which prys the cusp off as the machine advances. When the cusp drops it fragments into many pieces, thus gravity breaks it up into pieces small enough to pass through the receiving throat of the conveyor.

An endless chain conveyor 37 carries the cut and dislodged material away to the rear of the machine for transfer out of the mine. The forward end portion of the conveyor 37 includes a pair of forwardly extending flared side plates 38 defining the width of the conveyor throat. Forward of the side plates 38, there is a vertically extending plate 39 on each side of the machine, further defining the width of the conveyor throat. The lower part of the conveyor throat comprises a backwardly extending surface 41 atop the lower cutter bar and this is flared upwardly to cam the lower cusp in an upward direction to break it off from the face.

It will be seen, in Figure 1, that the lower cusp 29 is too wide to pass between the upstanding throat walls 39. It is also too wide to pass through the throat walls 38 and likewise too wide to fit on the conveyor even if it did pass the walls 38. For this reason, jamming of the throat has been experienced in machines of this type where the material being mined is so tough that it does not break up readily.

I have described in the foregoing one form of boring type mining machine with which the present invention is useful. It is believed unnecessary to describe such a machine in more detail, for which purpose reference can be had to the co-pending application of Joseph Gonski Serial No. 577,688 filed April 12, 1956 now issued as Patent No. 2,802,654 dated August 13, 1957 and to a number of patents and publications which have issued on this general type of machine.

Figure 2:
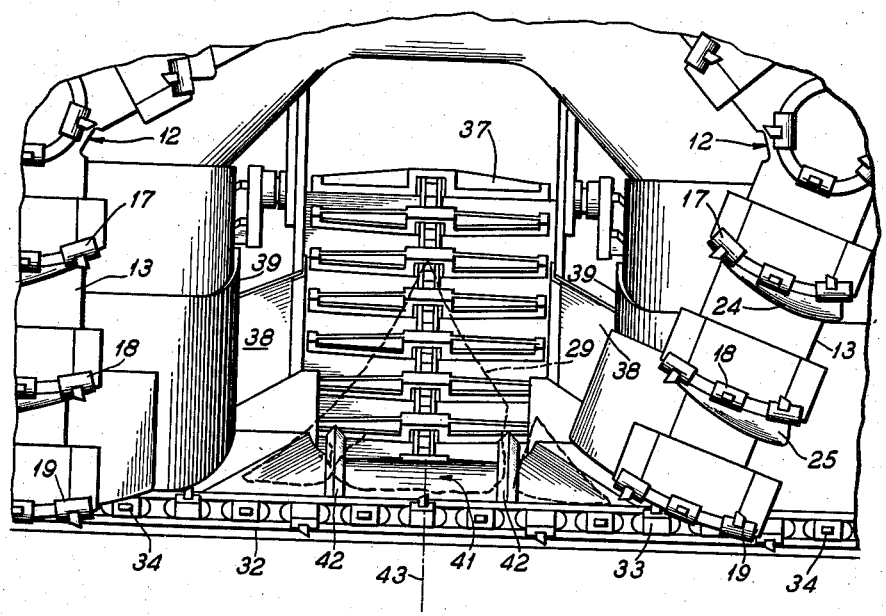
Figure 2 is a fragmentary, enlarged view of Figure 1, showing the boring arms rotated to expose the conveyor-receiving throat with a cusp being reduced by the breaker forming the subject of this invention.
Figure 3:
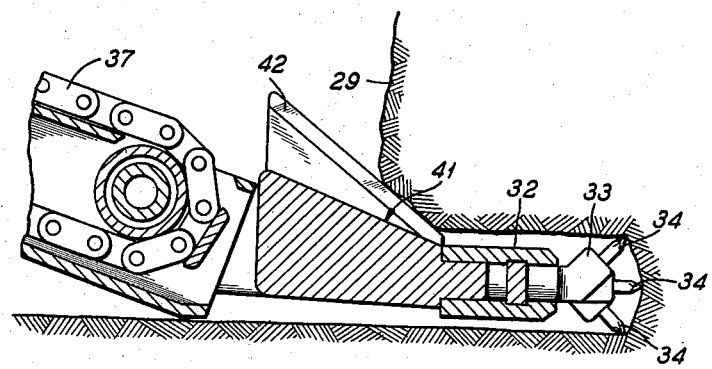
Figure 3 is a cross-sectional view of Figure 2, taken on the line 3—3.

Now, referring particularly to the cusp breaker of the present invention, a pair of upstanding breaker plates 42, 42 are mounted, as by welding, on the upper surface 41 of the lower cutter bar. As shown in Figure 1 these are spaced on each side of the vertical center line 43 of the machine. In one particular case in which the conveyor 37 is 24 inches wide we have found best results by spacing the breaker plates each 8 inches to the side of the center line. The tops of the plates 42 are preferably sharpened as shown in Figure 1 and may additionally be hard faced if the surface conditions warrant. As shown in Figure 3, it will be seen that the plates 42 are generally triangular in cross section having the lowest height at the forward end so as to fit underneath the cusp 29. The upward camming action then results in breakage of the cusp in generally vertical directions as shown in Figure 2 so that the maximum width or center portion, in the example given, would be only 16 inches wide and readily transferred to the throat onto the 24-inch wide conveyor.

While the invention has been described in terms of a preferred embodiment thereof, iits scope is intended to be limited only by the claims here appended.

I claim:

1. In a boring type continuous mining machine, having a portable frame, a pair of rotary cutter bearing boring arms mounted on said frame for rotation in intersecting circular paths for boring intersecting parallel bores in a deposit of mineral with at least one generally triangular cross-section cusp between said bores, cusp cutter means carried by said frame and disposed to cut said cusp free at its base in a plane substantially tangent to the paths of the outer cutting peripheries of said arms, a conveyor and a conveyor receiving throat carried on said frame and disposed centrally with respect to said boring arms for transferring material dislodged by said arms onto said conveyor, a pair of stationary breaker members carried by said frame between said cusp cutter means and said throat each being laterally spaced from a plane intersecting the frame centrally for breaking said cusp by head-on engagement with it at locations where the cusp is relatively weaker than at the middle.

2. In a boring type continuous mining machine, having a portable frame, a pair of rotary boring arms mounted on said frame for rotation about laterally spaced axes for cutting side by side bores in a deposit of mineral with a cusp between said bores adjacent the floor, a cutter guide carried by said frame and having a cusp cutter guided thereby along a floor level path for cutting said cusp free from the floor while still connected at its face to the deposit of mineral, a conveyor carried by said frame and having a receiving throat adjacent and behind said cusp cutter, a pair of cusp breaker plates substantially equally spaced on each side of the center of the frame for engaging said cusp where it is weaker than at the center, each of said breaker plates having a forward extension of height low enough to fit into the kerf cut by said cusp cutter and having a progressively increasing height in a backward direction for breaking the cusp by camming upward into the base of the cusp.

3. In a boring type continuous mining machine having a portable frame, a pair of forwardly extending cutter bearing rotary boring arms mounted on said frame for rotation about laterally spaced horizontal axes for cutting parallel bores in a deposit of mineral with at least a bottom cusp between said bores, a cutter chain guide carried by said frame and having an orbitally movable cutter chain guided therein for movement along a horizontal path substantially tangent at the bottom of the machine to the paths of movement of the outer peripheries of said boring arms, a conveyor carried by said frame and having a receiving throat on said cutter bar and located in a vertical plane halfway between said horizontal axes, cusp breaker means comprising a pair of breaker plates upstanding from said cutter bar in said throat on each side of said vertical plane for breaking said cusp by engagement with it at locations where the cusp is relatively weaker than in the middle, each of said breaker plates progressively increasing in height in a backward direction.

4. In a boring type continuous mining machine having a portable frame, a pair of boring heads mounted on said frame for rotation about laterally spaced axes and being effective to define side by side bores in a deposit of mineral with at least a floor level cusp between said bores, means for dislodging said cusp from the floor, a conveyor having a receiving portion, means for moving the dislodged cusp toward said receiving portion, said conveyor having a width which is less than base of said cusp, cusp breaker means carried by said frame comprising a pair of upstanding blades having forward portions disposed for engagement with the underside of said cusp, said blades being spaced apart laterally of the frame a distance less than said conveyor width to break said cusp into portions small enough to be transferred through said receiving portion onto said conveyor.

References Cited in the file of this patent

UNITED STATES PATENTS

| | | |
|---|---|---|
| 1,915,001 | McKinnon | June 20, 1933 |
| 2,798,706 | Silver | July 9, 1957 |